(12) United States Patent
Bauer et al.

(10) Patent No.: US 6,643,615 B1
(45) Date of Patent: Nov. 4, 2003

(54) PRODUCT DESIGN PROCESS WITH INCLUDED PRODUCIBILITY INFORMATION

(75) Inventors: Lowell Wilson Bauer, Schenectady, NY (US); Marc Thomas Edgar, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 09/350,384

(22) Filed: Jul. 9, 1999

(51) Int. Cl.$^7$ .................................................. G06G 7/48
(52) U.S. Cl. .............................. 703/6; 703/7; 700/83; 700/174
(58) Field of Search ..................... 703/6, 22; 700/110, 700/108, 109, 111, 83, 174, 180, 245, 97, 103, 104, 145, 212, 162; 702/81, 82, 83, 84, 179

(56) References Cited

U.S. PATENT DOCUMENTS

| | | | |
|---|---|---|---|
| 5,452,218 A | | 9/1995 | Tucker et al. |
| 5,539,652 A | * | 7/1996 | Tegethoff .................... 364/490 |
| 5,631,825 A | * | 5/1997 | van Weele et al. ........... 700/83 |

OTHER PUBLICATIONS

The Handbook of Mathematical Sciences 5th Edition, by William H. Beyer, CRC Press, 1978, ISBN 0–493–0655–8, pp. 733–734.*
Artificial Intelligence by Time–Live Books Inc, ISBN 0–8094–5675–3, 1986, pp. 38 to 43.*

* cited by examiner

Primary Examiner—Kevin J. Teska
Assistant Examiner—Eduardo Garcia-Otero
(74) Attorney, Agent, or Firm—Patrick K. Patnode; Christian G. Cabou

(57) ABSTRACT

A method for providing producibility information to a user during a design process includes providing process capability models with integrated coaching information and providing a producibility evaluation worksheet having at least one input and at least one output, the input being selectable to represent a specific design. The worksheet is initialized with a relevant process capability model that is used to determine a producibility measure indicating an effect of the input on the output. The producibility measure is then displayed to the user.

5 Claims, 5 Drawing Sheets

| 200 Start modeling by choosing a Class, then look at comments | 202 Design Choices -- Attribute Variables |||||  |
|---|---|---|---|---|---|---|
| | Class | Reservoir Size | Gap | Joint Width | Joint Accessibility | 204 |
| | B | 1.1-1.5 | 0 to 2 | < .05 | restricte | 208 |

| Outputs | | | | | | Rolled Totals |
|---|---|---|---|---|---|---|
| Coverage | | 89.000% | 100.000% | 100.000% | 90.000% | 80.100% coverage rolled yield |
| External Fillet | | 98.000% | 100.000% | 100.000% | 96.000% | 94.080% extrenal fillet rolled yield |
| Excess Braze | | 100.000% | 99.700% | 97.200% | 90.000% | 87.218% excess braze rolled yield |
| 206 | | ↓ | ↓ | ↓ | ↓ | ↓ |
| Total yield contribution | | 87.220% | 99.700% | 97.200% | 77.760% | 65.725% total rolled yield |
| equivalent dpmo | | 127800 | 3000 | 28000 | 222400 | 342745 yield-based dpmo |
| equivalent sigma | | 2.6 | 4.2 | 3.4 | 2.3 | 1.9 sigma equiv to dpmo |

| Comments | |
|---|---|
| Class | Class A is for critical joints; Class B is usual requirement; Class C is seldom specified |
| Reservoir Size | larger reservoir helps coverage and external fillet; smaller reservoir reduces excess braze |
| Gap | best choice for coverage and external fillet |
| Joint Width | Wider joint helps excess braze and hurts coverage |
| Joint Accessibility | More access is better and improves coverage, external fillet and excess braze |

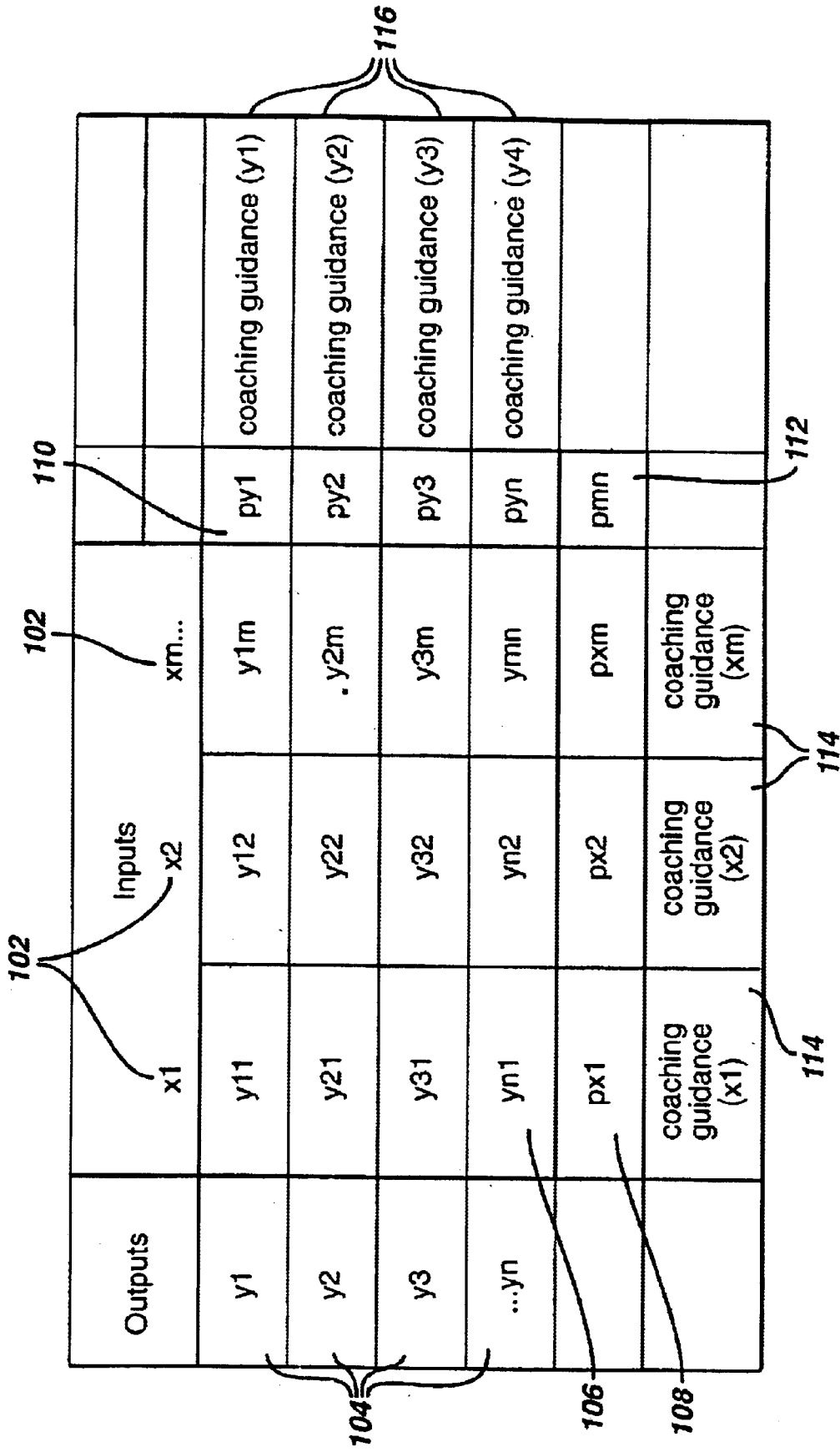

FIG. 4

Start modeling by choosing a Class, then look at comments

Design Choices -- Attribute Variables

| Outputs | Class | Reservoir Size | Gap | Joint Width | Joint Accessibility | Rolled Totals | |
|---|---|---|---|---|---|---|---|
| | B | 1.1-1.5 | 0 to 2 | < .05 | restricte | | |
| Coverage | | 89.000% | 100.000% | 100.000% | 90.000% | 80.100% | coverage rolled yield |
| External Fillet | | 98.000% | 100.000% | 100.000% | 96.000% | 94.080% | external fillet rolled yield |
| Excess Braze | | 100.000% | 99.700% | 97.200% | 90.000% | 87.218% | excess braze rolled yield |
| Total yield contribution | | 87.220% | 99.700% | 97.200% | 77.760% | 65.725% | total rolled yield |
| equivalent dpmo | | 127800 | 3000 | 28000 | 222400 | 342745 | yield-based dpmo |
| equivalent sigma | | 2.6 | 4.2 | 3.4 | 2.3 | 1.9 | sigma equiv to dpmo |

Comments

| | |
|---|---|
| Class | Class A is for critical joints; Class B is usual requirement; Class C is seldom specified |
| Reservoir Size | larger reservoir helps coverage and external fillet; smaller reservoir reduces excess braze |
| Gap | best choice for coverage and external fillet |
| Joint Width | Wider joint helps excess braze and hurts coverage |
| Joint Accessibility | More access is better and improves coverage, external fillet and excess braze |

FIG. 5

Start modeling by choosing a Class, then look at comments

Design Choices -- Attribute Variables

| | Class | Reservoir Size | Gap | Joint Width | Joint Accessibility | | Rolled Totals |
|---|---|---|---|---|---|---|---|
| | B | ▶1.6-2.0 | ▶0 to 2 | ▶<.05 | ▶limited | | |
| Outputs | | | | | | | |
| Coverage | | 99.300% | 100.000% | 100.000% | 99.500% | | 98.804% coverage rolled yield |
| External Fillet | | 99.900% | 100.000% | 100.000% | 99.500% | | 99.401% extrenal fillet rolled yield |
| Excess Braze | | 100.000% | 99.700% | 99.200% | 99.900% | | 96.811% excess braze rolled yield |
| Total yield contribution | | 99.201% | 99.700% | 97.200% | 98.903% | | 95.080% total rolled yield |
| equivalent dpmo | | 7993 | 3000 | 28000 | 10965 | | 49203 yield-based dpmo |
| equivalent sigma | | 3.9 | 4.2 | 3.4 | 3.8 | | 3.2 sigma equiv to dpmo |

Comments

| | |
|---|---|
| Class | Class A is for critical joints; Class B is usual requirement; Class C is seldom specified |
| Reservoir Size | larger reservoir helps coverage and external fillet; smaller reservoir reduces excess braze |
| Gap | best choice for coverage and external fillet |
| Joint Width | Wider joint helps excess braze and hurts coverage |
| Joint Accessibility | More access is better and improves coverage, external fillet and excess braze |

210

PRODUCT DESIGN PROCESS WITH INCLUDED PRODUCIBILITY INFORMATION

BACKGROUND OF THE INVENTION

This invention relates to a method of guiding design and manufacturing choices and, in particular, relates to a method of providing producibility information to a user during a product design process.

Continual evaluation of the producibility of an evolving design is useful in quickly reaching markets with high quality and affordable products. Designers may be faced with design decisions requiring specialized knowledge outside their areas of expertise that have major impact on producibility as measured by cost, quality and/or cycle time. Tradeoffs between interacting and conflicting design choices often must be made by the designer. Accordingly, there is a perceived need to provide the designer with producibility information during the product design process.

BRIEF SUMMARY OF THE INVENTION

An exemplary embodiment of the invention is directed to a method for providing producibility information to a user during a design process. The method includes providing a process capability model and providing a producibility evaluation worksheet having at least one input and at least one output. The user may alter the input to represent a specific design. The process capability model is used to determine a producibility measure indicating an effect of the input on the output. The producibility measure is then displayed to the user.

BRIEF DESCRIPTION OF THE DRAWINGS

FIG. 3 is a depiction of an exemplary, generic producibility evaluation worksheet;

FIG. 4 is a depiction of a producibility evaluation worksheet for an exemplary braze joint; and FIG. 5 is a depiction of the producibility evaluation worksheet of FIG. 4 after modifications to the inputs.

DETAILED DESCRIPTION OF THE INVENTION

Figure 1:
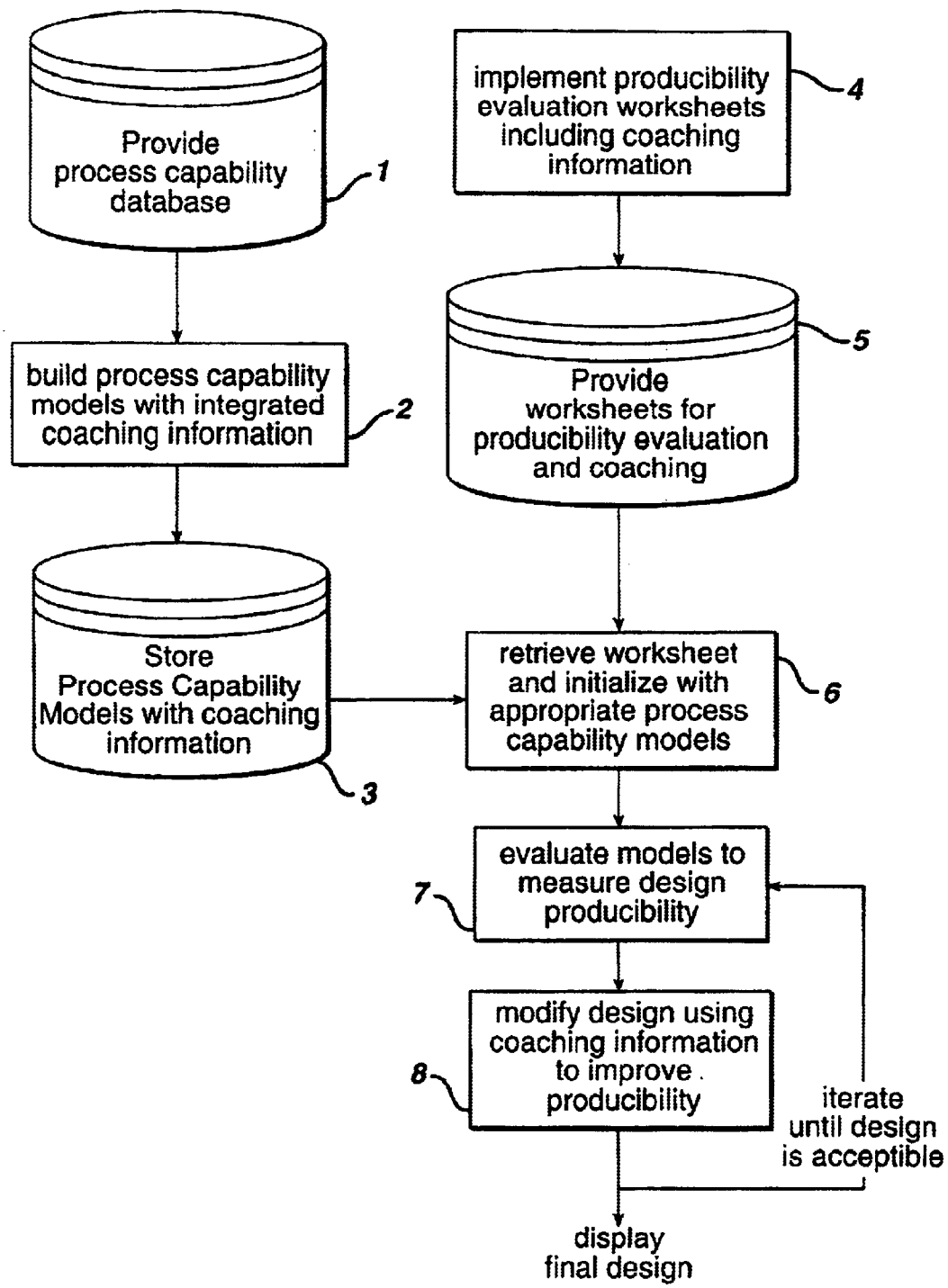
FIG. 1 is a flowchart of a method for providing producibility information to a user in an exemplary embodiment of the invention.

In the flowchart of FIG. 1, which illustrates a preferred method for providing producibility information during a design process, the term "producibility" is intended to have a broad meaning relating to the ability to manufacture a product. Producibility, as used in FIG. 1, includes, but is not limited to, factors such as cost, quality and cycle time, where cost can include life-cycle costs such as reliability and maintainability. As shown in FIG. 1, process capability information gathered from production operations and suppliers is provided in a process capability database at step 1. Process capability models with coaching information are built from the process capability database and provided with integrated coaching information at step 2. This provides the user with information related to the relative impact design choices have on producibility, along with suggestions as to how changes in design will affect tradeoffs in producibility. For example, improving the fit-up of a welded joint might lower the number of weld defects but increase the cost. Information relating the impact of joint design on reliability might also be provided. Other guidance, such as designation of a particular welding process specification, helps assure that the manufacturing process meets design expectations. At step 3, the process capability models and process capability coaching information are stored in a database. At step 4, producibility evaluation worksheets, described herein with reference to FIGS. 3–5, are designed. Producibility coaching information relating how changes in a particular design or choices in manufacturing processes will affect producibility is also developed at step 4. At step 5, the producibility evaluation worksheets and the producibility coaching information are stored in a database.

The design process is initiated at step 6 where a user retrieves a producibility evaluation worksheet from those provided at step 5 and enters a description of the design on the worksheet. Relevant process capability models are retrieved from those stored at step 3; for example, if the design is directed to a braze joint, a process capability model directed to braze joints is retrieved from the process capability models stored at step 3. Producibility of the design, based on the process capability database and the user's entries of the producibility evaluation worksheet, is evaluated at step 7. At step 8, the user is provided with producibility coaching information which suggests ways to change the design that will improve producibility. Steps 7 and 8 are repeated until an acceptable design is reached.

Figure 2:
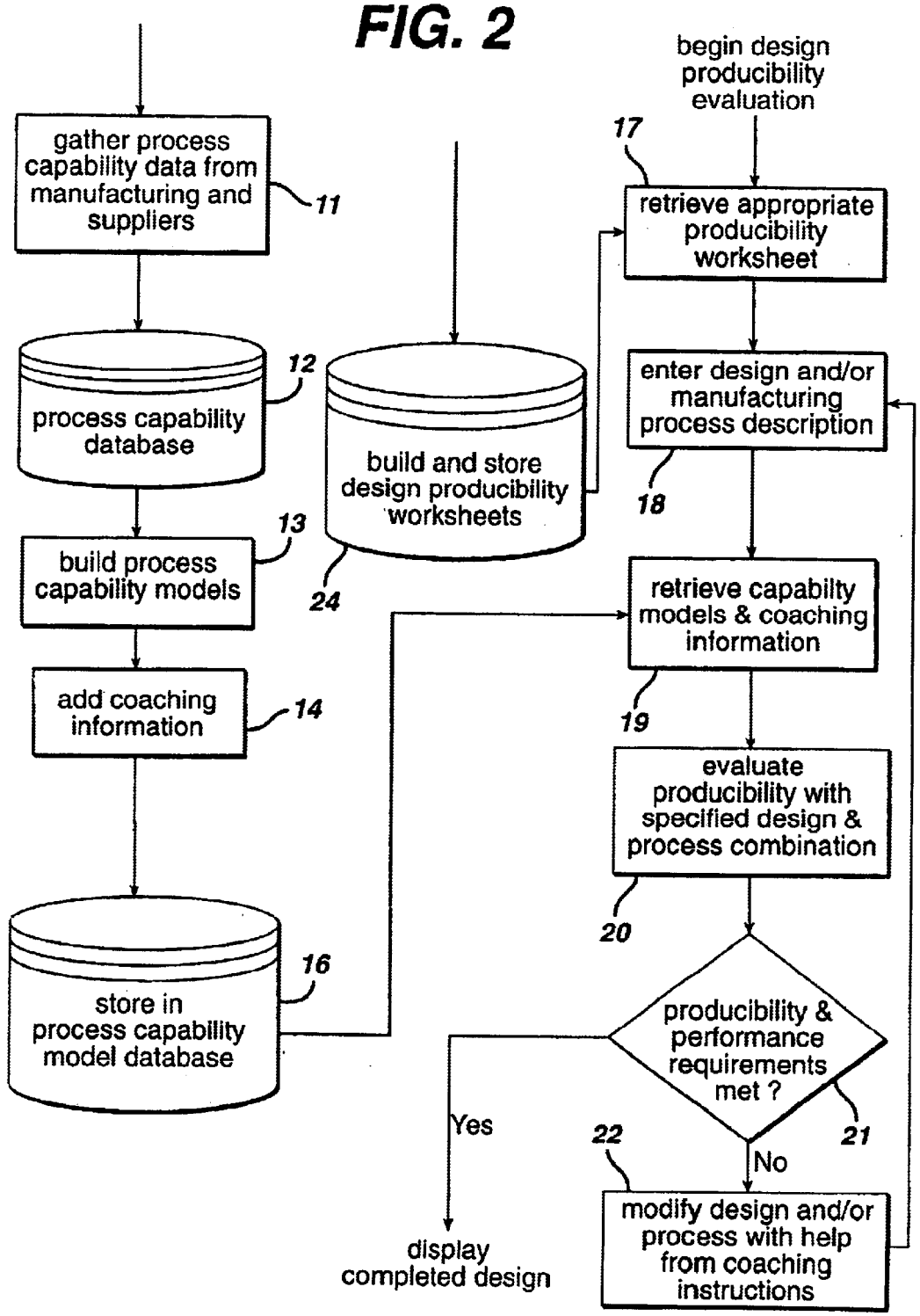
FIG. 2 is a more detailed flowchart of the method of FIG. 1 for providing producibility information to a user.

In the flowchart of FIG. 2, which illustrates in greater detail the method of FIG. 1 for providing producibility information during a design process, process capability data are gathered from internal manufacturing operations and from suppliers. At step 12, these data are stored in a process capability database from which, together with expert opinions, process capability models are built at step 13. The process capability models relate design descriptions (e.g., size, material, feature, etc.) to the capability of manufacturing processes to produce the design. Process capability coaching information is intergrated with the process capability models at step 14, so that, for particular design and process choices, guidance for alternative designs and/or processes is given. Process capability coaching information might include text, pictorial, graphical, web addresses and/or computational/modeling instructions. The process capability information and process capability coaching instructions are then organized and stored in a database at step 16. Producibility evaluation worksheets for use by users to input design descriptions and to evaluate producibility are generated and stored in a database as shown at step 24.

The design process begins at step 17 when a user retrieves an appropriate producibility evaluation worksheet from the database stored at step 24. The user enters design and/or manufacturing process descriptions at step 18. At step 19, process capability models, and any associated process capability coaching information needed to evaluated design producibility are retrieved from the process capability model database stored at step 16. Design and process descriptions entered in the producibility evaluation worksheet at step 19 are provided to the process capability model at step 20, allowing evaluation of producibility and the selection of appropriate coaching instructions to give guidance for improving producibility at step 20. The process capability models are used to compute a variety of producibility measures. If the design producibility and performance requirements are met, the design is accepted at step 21 and the process ends. If, at step 21, the design producibility and performance requirements are not met, the design and/or manufacturing process are modified at step 22 and flow of the design process proceeds to step 18 where the producibility evaluation is repeated.

In the exemplary, generic producibility evaluation worksheet 100 shown in FIG. 3, part and process descriptions are entered by the user as inputs or X's 102. Exemplary inputs include part size, feature of interest, material, manufacturing process, etc. The producibility evaluation worksheet provides the outputs or Y's 104. Exemplary outputs include, but not limited to, yield and cost. The outputs 104 can be functions of individual inputs 102 or a function of multiple inputs 102. At the intersection of each input and output is a producibility measure 106, which indicates how any specific input 102 affects the value or "yield" of the output 104. Rolled input producibility measures 108 labeled $p_{xm}$ reflect the total effect that an input has on all the output yields. The rolled input producibility measures 108 are determined by combining the producibility measures 106 for a specific input. Rolled output producibility measures 110 labeled $P_{yn}$ reflect the yield for a single output and are determined by combining the producibility measures 106 for a single output. Simultaneously providing the rolled input producibility measures 108 and the rolled output producibility measures 110 separates the contribution of the various inputs 102 and helps point out where design changes are needed. A total rolled producibility measure 112 indicates the yield for the overall design and is equal to the combined rolled input producibility measures 108 and is equal to the combined rolled output producibility measures 110. Exemplary "yield" Input coaching information 114 and output coaching information 116 provides more precise directions for design changes to improve the producibility or yield of the design.

FIG. 4 is an exemplary producibility evaluation worksheet 200 that a user may use to evaluate producibility of a braze joint and, in particular, the braze process yield. When the user opens the producibility evaluation worksheet, the specific input and output variables are predefined; the user provides values for the inputs. The user describes the design by choosing between a number of options available through pull-down menus 204. Five inputs 204 may be modified by the user, namely, class, reservoir size, gap, joint width and joint accessibility. Three outputs 206 are evaluated on the producibility evaluation worksheet, namely braze coverage, external braze fillet, and excess braze. These are the three inspection criteria that are evaluated in judging whether a braze joint is acceptable or unacceptable. It should be understood that the number of inputs and outputs may vary, depending on the design. As the choices for inputs 202 are made, the contents of producibility measures 208 are updated to reflect the impact of inputs on the manufacturing yield. Rolled input producibility measures, rolled output producibility measures and a total rolled producibility measure are determined as described above with reference to FIG. 3. In the embodiment shown in FIG. 4, the rolled producibility measures are based on the product of corresponding producibility measures. Producibility worksheet 200 also includes the equivalent defects per million opportunities (dpmo) 212 for each input 202 and a total dpmo 214 for the entire process. In addition, an equivalent sigma value 216 for each input 202 and total sigma value 218 for the entire process is determined. The sigma values 216 and 218 are derived based on the normal, statistical distribution, and signify the distribution or spread about the mean (average) of the process, where the higher the sigma value, the lower the rate of occurrence of defects.

For each input, coaching information 210 is provided to suggest how design changes could improve braze process yield. For example, the rolled input producibility measure for reservoir size, based on the present inputs 202, is 87.22%, while the rolled input producibility measure for joint accessibility is 77.760%. The total rolled producibility measure for the part is 65.725%. By comparing the rolled input producibility measures for each of the inputs, one sees that the reservoir size and joint accessibility are the two major contributors to the low total rolled producibility measure (i.e., yield) for the brazing process. The coaching information for reservoir size suggests that a larger reservoir would be better. Similarly, the coaching information for joint accessibility recommends more accessible joints. The result of a user implementing these coaching suggestions is shown in FIG. 5, where the design has been changed to make a larger reservoir and the joint has been made more accessible. The rolled input producibility measure is now 99.201% for reservoir size and 98.903% for joint accessibility. The total rolled producibility measure for the brazing process has now been raised to 95.080% from 65.725%. The coaching instructions 210 have changed and now point out the tradeoffs in further changes in reservoir size and indicate that better access would still help the process yield.

The invention can be embodied in the form of computer-implemented processes and apparatuses for practicing those processes. The invention can also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The invention can also be embodied in the form of computer program code, for example, whether stored in a storage medium, loaded into and/or executed by a computer, or transmitted over a transmission medium such as electrical wiring or cabling, fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While only certain preferred features of the invention have been illustrated and described, many modifications and changes will occur to those skilled in the art. It is, therefore, to be understood that the appended claims are intended to cover all such modifications and changes as fall within the true spirit of the invention.

What is claimed is:

1. A method for providing producibility information to a user during a braze joint design process comprising the steps of providing a process capability database configured to be populated with a plurality of historical process capability data obtained from manufacturing process of said braze joint;

providing a process capability model with integrated coaching information; said process capability model configured to correlate at least one design input variable of said braze joint with said process capability data to assess capability of said manufacturing process for producing said braze joint design;

providing a producibility evaluation worksheet having at least one predetermined design input variable and at least one predetermined design output variable;

initializing said producibility evaluation worksheet with said process capability model with integrated coaching information to indicate effect of altering said at least one design input variable on said design output variable;

determining from said process capability model a plurality of producibility measures for said braze joint indicating an yield of said design output variable of the braze joint; and displaying said producibility measure to the user.

2. The method of claim 1, wherein said producibility measures comprises at least one rolled output producibility measure to indicate effect of altering any of said design input variable on said yield of the design output variable of said braze joint.

3. The method of claim 1, wherein said producibility measures comprises at least one rolled input producibility measure to indicate effect of altering said design input variable on said yield of all the design output variables of said braze joint.

4. The method of claim 1, wherein said producibility measure comprises a rolled total producibility measure to indicate effect of altering value for any of said design input variable on said yield of all the design output variables of said braze joint.

5. A computer enabled apparatus for providing producibility information to a user during a braze joint design process the apparatus including instructions for causing said apparatus to implement a method comprising:

providing a process capability database configured to be populated with a plurality of historical process capability data obtained from manufacturing process of said braze joint;

providing a process capability model with integrated coaching information; said process capability model configured to correlate at least one design input variable of said braze joint with said process capability data to assess capability of said manufacturing process for producing said braze joint design;

providing a producibility evaluation worksheet having at least one predetermined design input variable and at least one predetermined design output variable;

initializing said producibility evaluation worksheet with said process capability model with integrated coaching information to indicate effect of altering said at least one design input variable on said design output variable;

determining from said process capability model a plurality of producibility measures for said braze joint indicating an yield of said design output variable of the braze joint; and displaying said producibility measure to the user.

* * * * *